(12) United States Patent
Tan et al.

(10) Patent No.: US 10,783,107 B2
(45) Date of Patent: Sep. 22, 2020

(54) PROCESSING APPARATUS AND METHODS

(71) Applicant: Cambridge Consultants Limited, Cambridge (GB)

(72) Inventors: Robert Wei Liang Tan, Cambridge (GB); Lucy Emma Archer, Cambridge (GB); Bryan James Donoghue, Cambridge (GB)

(73) Assignee: Cambridge Consultants Limited, Cambridge (GB)

( * ) Notice: Subject to any disclaimer, the term of this patent is extended or adjusted under 35 U.S.C. 154(b) by 0 days.

(21) Appl. No.: 15/765,266

(22) PCT Filed: Oct. 3, 2016

(86) PCT No.: PCT/GB2016/053074
§ 371 (c)(1),
(2) Date: Apr. 1, 2018

(87) PCT Pub. No.: WO2017/055880
PCT Pub. Date: Apr. 6, 2017

(65) Prior Publication Data
US 2018/0293203 A1    Oct. 11, 2018

(30) Foreign Application Priority Data
Oct. 2, 2015 (GB) .................................. 1517445.1

(51) Int. Cl.
*G06F 15/167* (2006.01)
*G06F 13/16* (2006.01)
(Continued)

(52) U.S. Cl.
CPC ........ *G06F 15/167* (2013.01); *G06F 13/1657* (2013.01); *G06F 13/1663* (2013.01);
(Continued)

(58) Field of Classification Search
CPC ............... G06F 13/1663; G06F 15/167; G06F 15/17381; G06F 13/1657; G06F 9/3885
See application file for complete search history.

(56) References Cited

U.S. PATENT DOCUMENTS 5,594,734 A * 1/1997 Worsley .................. H04L 12/44
370/395.53
6,993,637 B1 1/2006 Kwong
(Continued)

FOREIGN PATENT DOCUMENTS

EP 2498187 9/2012
GB 2542853 4/2017
(Continued)

OTHER PUBLICATIONS

International Search Report and the Written Opinion dated Jan. 13, 2018 From the International Searching Authority Re. Application No. PCT/GB2016/053074. (11 Pages.).
(Continued)

*Primary Examiner* — Shean Tokuta
*Assistant Examiner* — Juan C Turriate Gastulo (57) ABSTRACT

Processing apparatus in the form of a parallel processing configuration having a plurality of processors and at least one shared memory that is shared between the processors. Each processor is operated at a clock speed that is lower than the clock speed of the memory.

20 Claims, 7 Drawing Sheets

(51) Int. Cl.
*G06F 15/173* (2006.01)
*G06F 9/38* (2018.01)

(52) U.S. Cl.
CPC ...... *G06F 15/17381* (2013.01); *G06F 9/3885* (2013.01); *Y02D 10/14* (2018.01)

(56) References Cited

U.S. PATENT DOCUMENTS

| | | | | |
|---|---|---|---|---|
| 2002/0056030 | A1* | 5/2002 | Kelly | G06F 9/3802 |
| | | | | 711/150 |
| 2005/0125596 | A1* | 6/2005 | Yap | G06F 13/4243 |
| | | | | 711/105 |
| 2012/0226873 | A1* | 9/2012 | Barat Quesada | G06F 15/167 |
| | | | | 711/148 |
| 2017/0060811 | A1* | 3/2017 | Yang | G06F 9/3001 |

FOREIGN PATENT DOCUMENTS

| | | | | |
|---|---|---|---|---|
| WO | WO-2013136259 A2 * | 9/2013 | ........... | G06F 15/167 |
| WO | WO 2017/055880 | 4/2017 | | |

OTHER PUBLICATIONS

Patents Act 1977: Search Report Under Section 17(5) dated Jan. 22, 2016 From the Intellectual Property Office, Patents Directorate of the United Kingdom of Great Britain Re. Application No. GB1517445.1. (4 Pages).

* cited by examiner

PROCESSING APPARATUS AND METHODS

RELATED APPLICATIONS

This application is a National Phase of PCT Patent Application No. PCT/GB2016/053074 having International filing date of Oct. 3, 2016, which claims the benefit of priority of United Kingdom Patent Application No. 1517445.1 filed on Oct. 2, 2015. The contents of the above applications are all incorporated by reference as if fully set forth herein in their entirety.

FIELD AND BACKGROUND OF THE INVENTION

The present invention relates to a processing apparatus and to associated methods.

Many algorithms in the field of digital signal processing can be split into multiple independent tasks that can be processed in parallel with one another. These independent tasks can be partitioned across multiple processing elements to achieve a shorter computation time and/or higher computation throughput.

In order to manage the processing of an algorithm that has been split into multiple independent tasks the multiple processing elements must be able to coordinate with one another. To achieve this, the multiple processing elements are provided with some means of communication that allows them to pass messages between one another, and to distribute input data and results. Such communication between parallel processing elements typically takes the form of FIFO (First In First Out) buffers or shared memory.

With the continuing drive to improve processing performance, as new processors are developed designers seek to achieve maximum performance by increasing the speed of the processor resulting in clock speeds in excess of 1 GHz becoming increasingly common. This high clock speed for a processor is generally achieved through the use of processor pipelines which can be more than ten cycles deep.

However, the use of such deep processor pipelines present a number of technical issues. For example, the use of deep processor pipelines make it difficult to code efficient parallel algorithms. Moreover, short processing loops are not efficient in a deep pipeline processor since they have a tendency to cause pipeline stalls. This is a severe disadvantage in digital signal processing where short processing loops are common. Code branching can also cause stalls in the processor pipeline which make it difficult to predict the execution time of a particular code routine. This, in turn, makes it more difficult to coordinate the operation of several parallel algorithms because their execution time is unknown.

The processor clock speed (e.g. 1 GHz) is typically faster than the program or data memory speed (e.g. 100 to 400 MHz). Modern processors generally make use of caches to allow the processor to run at full speed without stalling due to slow memory access times. However, caches can only store a subset of recently used program instructions and data and hence there is often a need to transfer program code and/or data between the cache memory and main memory. When such a transfer is required then a pipeline stall (and associated drop in performance) typically occurs. Use of cache or main memory is difficult to predict which results in an unpredictable variation in the execution time of a code routine.

The requirement for such high clock speeds in the processor also forces the use of the highest speed (and hence most power-hungry) logic gates and necessitates significantly more logic to coordinate the operation of a deep pipeline.

In summary, modern processor design encourages the use of deep processor pipelines and caches for program and data memory. These approaches reduce the ability of programmers to develop efficient parallel processing implementations since execution time of code routines is unpredictable. An additional penalty is the inefficiency of deep processor pipelines in the case of short processing loops. High speed processors are also power inefficient when compared with slower speed processors.

For illustrative purposes, parallel processing configurations comprising different mechanisms for communication between processors in a parallel processing system will now be described, by way of example only with reference to FIGS. 1 and 2.

Figure 1:
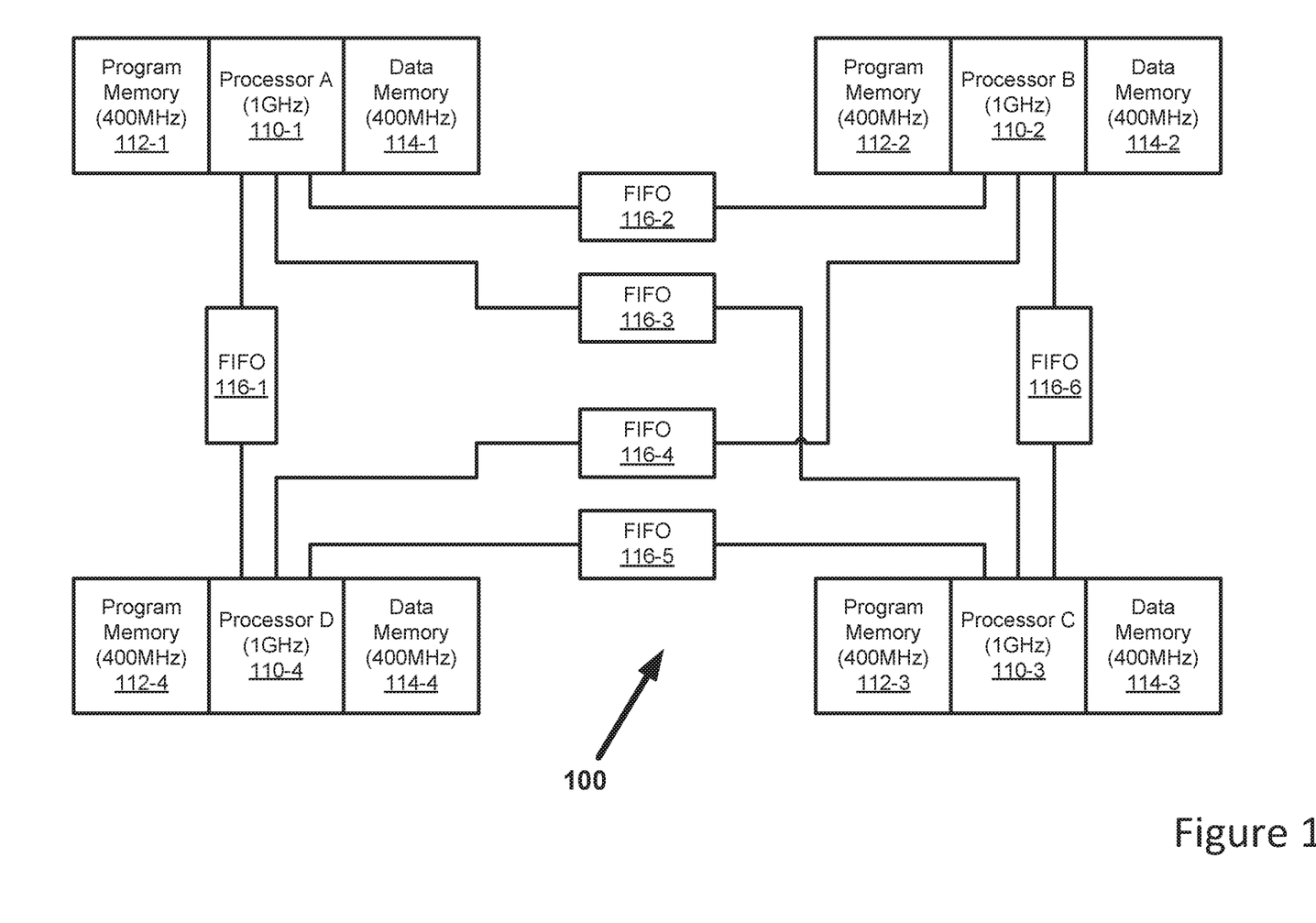
FIGS. 1 and 2 illustrate known parallel processing configurations.

FIG. 1 shows, generally at 100, a parallel processing configuration with fast processors and FIFO communication. As seen in FIG. 1 the parallel processing configuration 100 comprises four 1 GHz processors 110-1 to 110-4, each having a respective processor dedicated 400 MHz program memory 112-1 to 112-4 and a respective processor dedicated 400 MHz data memory 114-1 to 114-4. The processors 110 are able to pass messages and data between one another via six FIFO buffers 116-1 to 116-6. An advantage of the configuration of FIG. 1 is that the processors are normally able to operate at a higher speed than the FIFO buffer memory.

However, disadvantages of this configuration include: high latency on communication between processors; limited flexibility in the format of data passed between processors; inefficient (in CPU cycles) for large blocks of data which must be copied into and out of the FIFO; and the inefficient duplication of data in multiple local memories.

Figure 2:
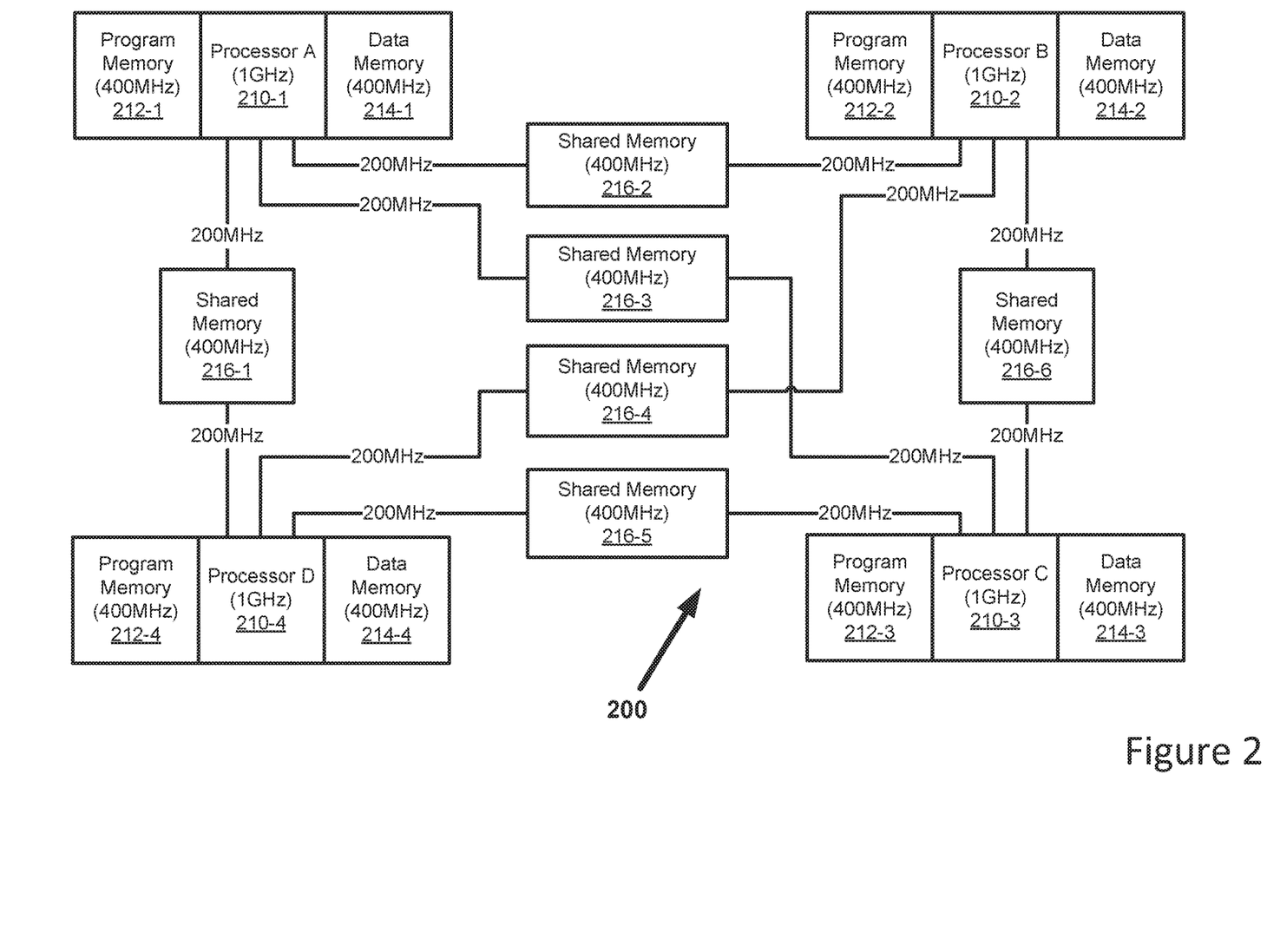

FIG. 2 on the other hand shows, generally at 200, a parallel processing configuration with processors that are able to pass messages and data via a shared memory. As seen in FIG. 2, the parallel processing configuration 200 comprises four 1 GHz processors 210-1 to 210-4, each having a respective processor dedicated 400 MHz program memory 212-1 to 212-4 and a respective processor dedicated 400 MHz data memory 214-1 to 214-4. The processors 210 are able to pass messages and data between one another via six 400 MHz shared memories 216-1 to 216-6. In this example the shared memory is single-ported and access is multiplexed between the connected processors so that each processor can read or write at a 200 MHz rate. An advantage of this scheme is the processors are able to operate at a higher speed than the shared memory.

However, disadvantages of this configuration include: high latency on communication (for large data blocks) due to the time taken to copy data to and from shared memory; inefficient (in CPU cycles) for large blocks of data which must be copied into and out of the shared memory; and duplication of data in local and shared memory.

SUMMARY OF THE INVENTION

The present invention seeks to provide a system and associated apparatus and methods for overcoming or at least partially ameliorating the above issues.

In one aspect of the invention there is provided processing apparatus comprising a parallel processing configuration having a plurality of processors and at least one shared memory that is shared between said plurality of processors, wherein said each of said plurality of processors is operated at a first clock speed and said at least one shared memory is operated at a second clock speed wherein said first clock speed is lower than said second clock speed.

The at least one shared memory may comprise: at least one shared data memory; at least one shared program memory; and/or at least one memory that is shared between a plurality of processors and at least one other entity (e.g. a peripheral such as a direct memory access peripheral and/or a turbo decoder).

The second clock speed may be substantially an integer multiple of said first clock speed. The first clock speed may be configured to be matched to an available access rate of the at least one shared memory (e.g. to that of at least one shared data memory). The first clock speed may be configured to be substantially equal to a clock speed of the at least one shared memory divided by a quantity of processors (and any other entities) that share that memory.

At least one of the processors may be a short-pipeline (e.g. a 1, 2 or 3-stage) processor. Each processor may be connected to more than one other processor via a shared memory. The processors and at least one memory may form a connected mesh that allows transfer of data between any processors in the mesh. The processors may be able to read or write to a plurality of data memories in a single processor clock cycle. The processors may be arranged to complete instructions at an average rate of one instruction per processor clock cycle even if the said instructions require read or write access to a plurality of items of data.

The first clock speed may be sufficiently low to allow each processor to be implemented using low-power silicon logic circuits selected from a standard digital logic gate library characterised by at least one of the following parameters: low-power process; low supply voltage; and high voltage threshold.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF THE SEVERAL VIEWS OF THE DRAWINGS

Embodiments of the invention will now be described by way of example only with reference to the attached figures in which.

DESCRIPTION OF SPECIFIC EMBODIMENTS OF THE INVENTION

Figure 3:
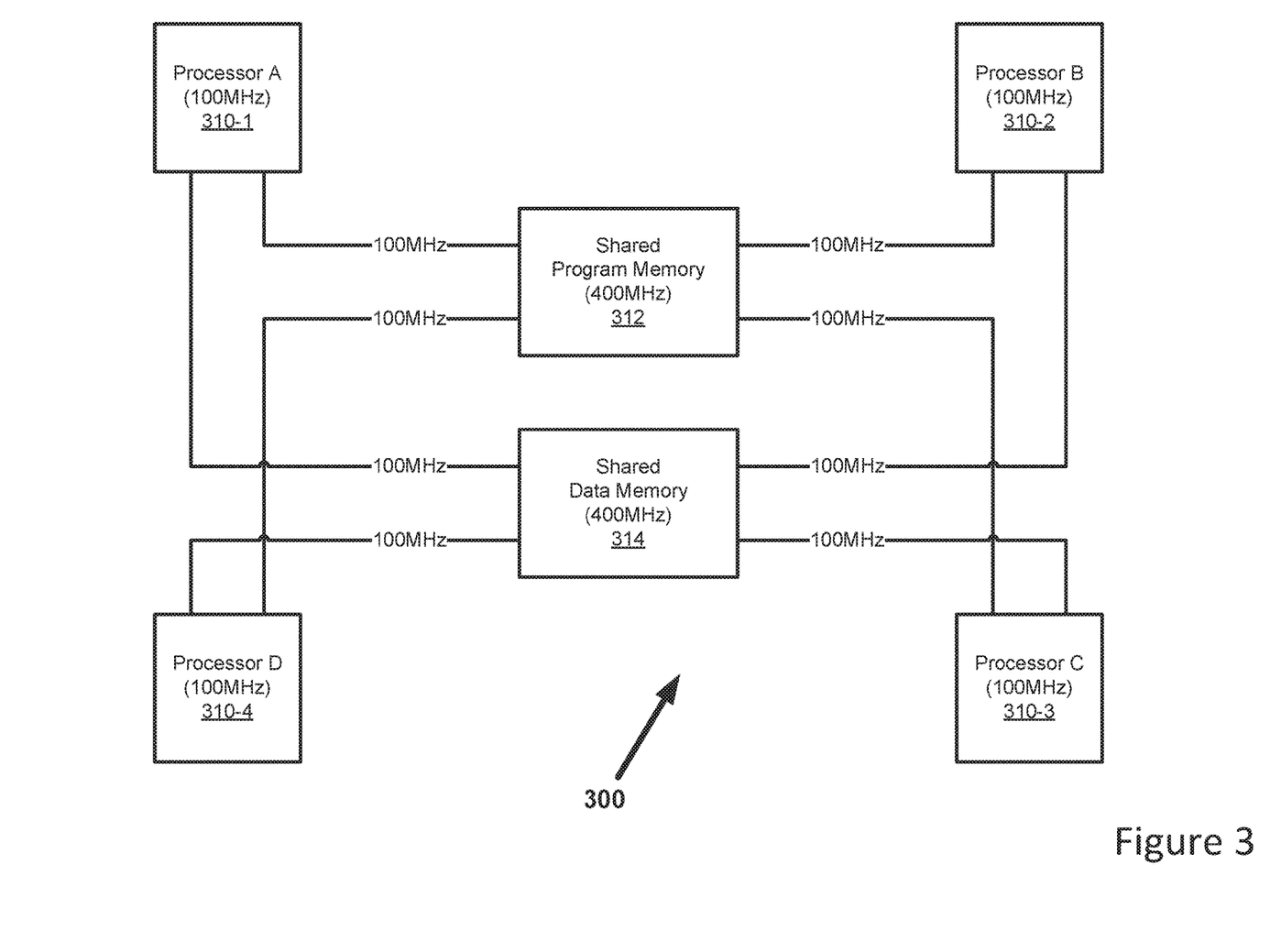
FIG. 3 illustrates an example of a different parallel processing configuration.

FIG. 3 shows, generally at 300, an example of a parallel processing configuration that has advantages over known parallel processing configurations in many applications.

As seen in FIG. 3, the parallel processing configuration 300 comprises four 100 MHz processors 310-1 to 310-4. Rather than having processor dedicated program memory and processor dedicated data memory, the processors 310 of the parallel processing configuration 300 are provided, in this example, with a shared (single-ported) 400 MHz program memory 312 and a shared (single-ported) 400 MHz data memory 314.

It will be appreciated that whilst shown as two separate memories in this example, the shared program memory 312 and shared data memory 314 need not form part of a physically separate memory but may form different parts of a single shared physical memory. It will also be appreciated that any such data/program partition may be permanent or may change dynamically. Further, whilst this example advantageously includes both a shared program memory 312 and a shared data memory 314 this need not be the case. There may, for example, be no shared program memory, with each processor having its own dedicated program memory.

Accordingly, and somewhat counter-intuitively, in the parallel processing configuration 300 of FIG. 3, the processors 310 are deliberately run at a lower clock speed than the shared memories 312, 314.

Advantageously, the clock speed of each processor 310 is matched to the available access rate of the shared data memory 314 (and, in this example, the shared program memory 312 also). Since the shared program memory 312 and shared data memory 314 of this example are single-ported, each processor 310 is operated at a clock speed of 100 MHz (i.e. the clock speed of the shared memory divided by the number of processors sharing that memory). Thus, with appropriate synchronisation, the processors 310 can each perform a respective read or write operation on a different consecutive access cycle of the shared memory 312, 314. This is particularly efficient because it allows, with appropriate programming, all memory access cycles and all processor cycles to be used. Moreover, it allows data written to the shared data memory 314 by one processor 310 (e.g. processor A 310-1) in a particular memory access cycle to be accessed immediately, in the following memory access cycle, by the next processor in the access sequence (e.g. processor B 310-2). The shared program memory 312 can also be accessed by different processors 310 on consecutive memory access cycles and the same program code stored in the shared program memory 312 can be shared between the different processors if necessary.

Thus, whilst the processors of this embodiment are each run at a significantly lower rate than more conventional parallel processing configurations, the use of such a low clock rate, relative to the memory access rate, provides a number of benefits.

For example, the use of such low processor clock speeds enables the use of very short (e.g. 2-cycle) processor pipelines. This, in turn, results in more efficient implementation of parallel processing algorithms because of the improved efficiency with which the short processing loops can be implemented and because of the improved accuracy with which the execution time of code can be predicted allowing for more efficient partitioning of algorithms. Moreover, the parallel processing configuration allows even complex instructions to be implemented in a single processing cycle.

The parallel processing configuration 300 also allows each processor to be implemented using low-speed, power-efficient (and cheaper) logic gates. This means that ten processors designed to run at 100 MHz will consume significantly less power than a processor designed to run at 1 GHz. Hence, significant power savings could follow even if the parallel processing configuration 300 of FIG. 3 were extended using multiple additional processors (and possibly additional shared program and/or additional data memories) to provide processing speeds equivalent to a single faster (e.g. 1 GHz) processor, or even multiple faster processors arranged in a more conventional parallel processing configuration in which the processors operate at a faster clock speed than the associated memories.

The shared memory scheme provides significant advantages in memory bandwidth since each processor can access multiple data memories in each processor clock cycle. This is particularly advantageous for digital signal processing operations which are typically memory-access constrained. For example a multiply operation requires three memory accesses (two reads and one write). The parallel processing configuration 300 is able to provide the three memory accesses in two processor cycles. An enhanced configuration 400 in FIG. 4, with three data memory ports per processor, is able to provide the three memory accesses in one processor cycle. A conventional processor system with a 1 GHz processor and a single 400 MHz data memory port would require 7.5 processor cycles (three memory cycles) for the same operation.

Configurations such as 300, 400, 500 (FIG. 5), 600 (FIG. 6) and 700 (FIG. 7) in which processors can access multiple data memories in each processor clock cycle provide higher performance per processor clock cycle in DSP applications than a conventional single-processor system with a single data memory port e.g. 10 processors in configuration 500, each clocked at 100 MHz can execute 1 billion multiples per second whereas a single processor clocked at 1 GHz, with access to a single data memory clocked at 400 MHz can execute only 133.33 million multiplies per second.

There are also potential data communication advantages of the shared memory scheme used by the parallel processing configuration 300 including, for example: low latency communication because the processors 310 operate on shared data that need not be copied; efficient use of data memory (also because data does not need to be copied); efficient use of program memory because the processors 310 can share code routines).

It will be appreciated that whilst clock speed matching between the processors 310 and memories 312, 314, is particularly beneficial, the processor configuration will still provide advantages without such matching. Moreover, whilst in the above example the matching involves the processor clock speed being equal to the clock speed of the shared memory divided by the number of processors sharing that memory, similar matching could also be achieved with faster processors (e.g. an integer multiple of the clock speed of the shared memory divided by the number of processors sharing that memory).

Advantageously, and counter-intuitively, the processors of the configuration of FIG. 3 and the other configurations described herein, can be implemented using low-power silicon logic circuits. To assist understanding of what is meant by low-power silicon logic circuits', as those skilled in the art will know, processors can be implemented using standardised logic circuits selected from well known digital logic gate libraries. These logic gate libraries typically have a speed-power tradeoff that is dependent on a number of parameters. For example, the Taiwan Semiconductor Manufacturing Company Limited ('TSMC') create 40 nm silicon logic circuits with the choice of the following parameters:

Fast and high-power "G process" or slow and low-power "LP process"

Fast and high-power "High-Supply Voltage" and slow and low-power "Low Supply Voltage"

Fast and high-power "Low Voltage Threshold" or slow and low-power "High Voltage Threshold"

In this context, low-power silicon logic circuits would be circuits selected from a standard digital logic gate library characterised by at least one of the following parameters: low-power "LP process"; "Low Supply Voltage"; and "High Voltage Threshold".

8 Core 4-Phase Processor Configuration

Figure 4:
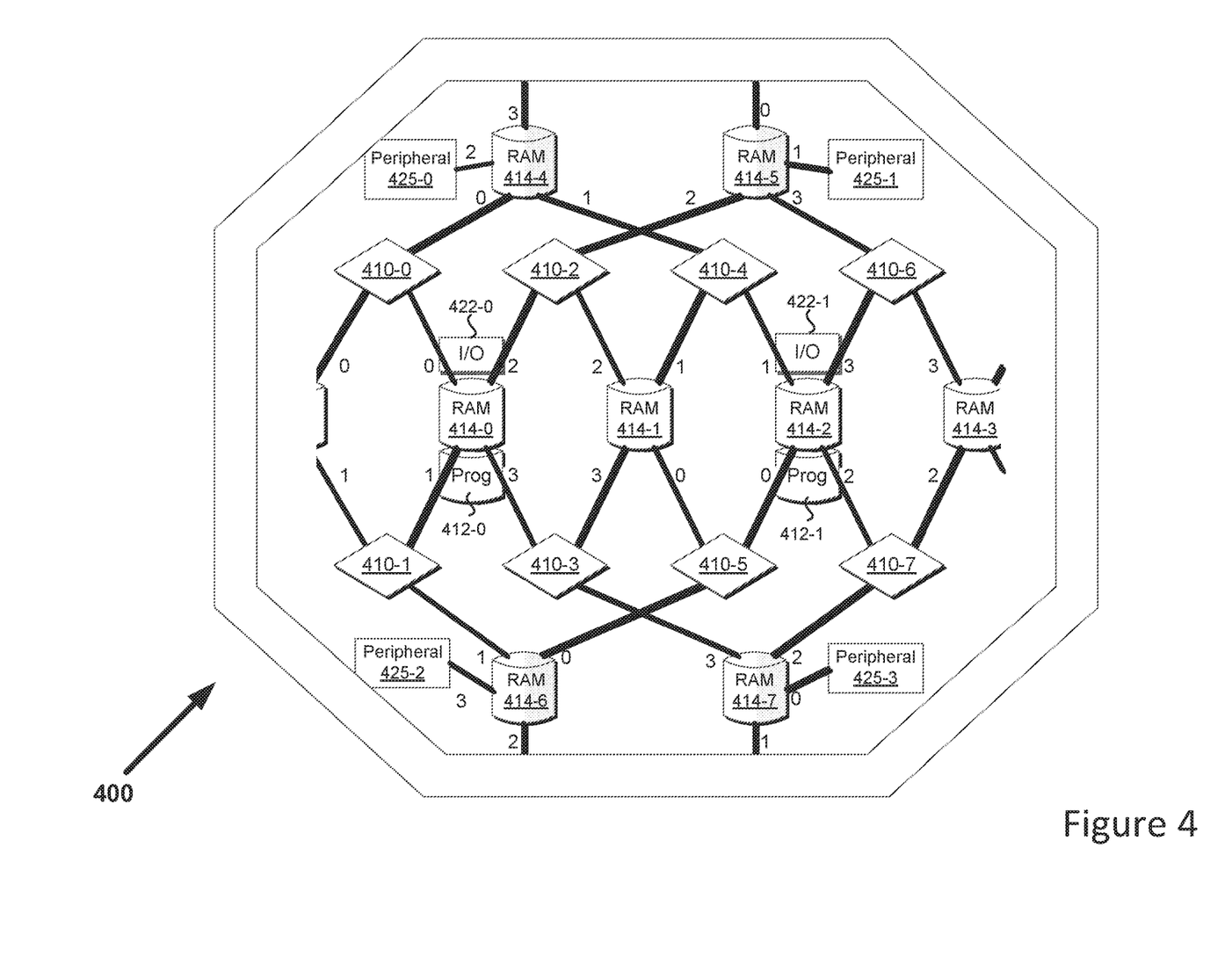
FIGS. 4, 5, 6 and 7 illustrate different architectures based on the parallel processing configuration of FIG. 3.

FIG. 4 shows, generally at 400, an exemplary parallel processing architecture that is based on the parallel processing configuration of FIG. 3.

The parallel processing architecture 400 of FIG. 4 comprises an 8-core 4-phase processor configuration comprising eight processors 410-0 to 410-7, eight shared data memories 414-0 to 414-7, and two shared program memories 412-0 and 412-1. The shared memories 412 and 414 may be provided on any suitable number physical memory devices including a single chip. It will be appreciated that, in FIG. 4, shared data memory 414-3 is shown, in part, on both the left hand side and right hand side of the figure.

Shared data memories 414-0 and 414-2 are each associated with a respective program memory 412-0 and 412-1 and with at least one respective input/output port 422-0 and 422-1 for receiving an input from or providing an output to a source external to the architecture 400. It will be appreciated that shared data memories 414-0 and 414-2 may each form part of the same memory as the associated program memory 412-0 and 412-1 if dual or multi-ported memory is used.

The parallel processing architecture 400 of FIG. 4, in this example, comprises four memories 414-0 to 414-3 which are only connected between processors 410. The parallel processing architecture 400 of FIG. 4, in this example, also comprises four memories 414-4 to 414-7 in which the processors 410 can store and retrieve data which may be shared with another processor 410, an external memory interface or a peripheral 425. External access to this memory may be via the external memory interfaces (e.g. 414-4 in phase 3, 414-5 in phase 0, 414-6 in phase 2 or 414-7 in phase 1).

It will be appreciated that the peripheral in this example, and in the other examples described, may be any suitable peripheral for example an external direct memory access (DMA), a turbo decoder and/or the like.

As seen in FIG. 4, the shared program memories 412 and shared data memories 414 of this example are single-ported and each shared by four processors 410 or by four devices (which may be a processor, peripheral or external memory interface). Each processor 410 in this example is therefore operated at a clock speed of a quarter that of each memory.

Shared data memory 414-0 and shared program memory 412-0 (which may be different parts of the same physical memory device) are each shared between processors 410-0, 410-1, 410-2 and 410-3.

Shared data memory 414-1 is shared between processors 410-2, 410-3, 410-4 and 410-5.

Shared data memory 414-2 and shared program memory 412-1 (which may be different parts of the same physical memory device) are each shared between processors 410-4, 410-5, 410-6 and 410-7.

Shared data memory 414-3 is shared between processors 410-0, 410-1, 410-6 and 410-7.

Shared memory 414-4 is shared between processors 410-0 and 410-4, peripheral 425-0 and an external memory interface.

Shared memory 414-5 is shared between processors 410-2 and 410-6, peripheral 425-1 and an external memory interface.

Shared memory 414-6 is shared between processors 410-1 and 410-5, peripheral 425-2 and an external memory interface.

Shared memory 414-7 is shared between processors 410-3 and 410-7, peripheral 425-3 and an external memory interface.

Operation of the 8-core 4-phase processor configuration at the heart of the parallel processing architecture 400 comprises four phases, phases 0 to 3, as represented by the single digit connector labels 0 to 3 in FIG. 4.

Phase 0

In phase 0:

processor 410-0 is provided with access to read data from or write data to data memories 414-0, 414-3 and 414-4, and access to retrieve instructions from program memory 412-0; and processor 410-5 is provided with access to read data from or write data to data memories 414-1, 414-2 and 414-6, and access to retrieve instructions from program memory 412-1.

Further, in phase 0 access is provided to memory 414-5 from outside the architecture 400 and peripheral access is provided to memory 414-7.

Phase 1

In phase 1:

processor 410-1 is provided with access to read data from or write data to data memories 414-0, 414-3 and 414-6, and access to retrieve instructions from program memory 412-0; and processor 410-4 is provided with access to read data from or write data to data memories 414-1, 414-2 and 414-4, and access to retrieve instructions from program memory 412-1.

Further, in phase 1 access is provided to memory 414-7 from outside the architecture 400 and peripheral access is provided to memory 414-5.

Phase 2

In phase 2:

processor 410-2 is provided with access to read data from or write data to data memories 414-0, 414-1 and 414-5, and access to retrieve instructions from program memory 412-0; and processor 410-7 is provided with access to read data from or write data to data memories 414-2, 414-3 and 414-7, and access to retrieve instructions from program memory 412-1.

Further, in phase 2 access is provided to memory 414-6 from outside the architecture 400 and peripheral access is provided to memory 414-4.

Phase 3

In phase 3:

processor 410-3 is provided with access to read data from or write data to data memories 414-0, 414-1 and 414-7, and access to retrieve instructions from program memory 412-0; and processor 410-6 is provided with access to read data from or write data to data memories 414-2, 414-3 and 414-5, and access to retrieve instructions from program memory 412-1.

Further, in phase 3 access is provided to memory 414-4 from outside the architecture 400 and peripheral access is provided to memory 414-6.

It can be seen, therefore, that the processors of this architecture may be beneficially configured to be able to read or write to a plurality of shared memories in a single processor clock cycle. Beneficially, therefore, each processor can read an instruction and one or more operands, and write the result of an operation, in a single clock cycle. On average, each processor can be configured to complete instructions at a rate of one instruction per processor clock cycle even when the instructions require read or write access to a plurality of items of data. This is significantly more efficient than other architectures such as, for example, von Neuman architectures in which multiple clock cycles are required for reading an instruction and the data to be operated on, or for example, conventional Harvard architectures with a single data memory which allow access to at most one data item per clock cycle The ability of each processor to read and write a plurality of items of data in a single clock cycle has the further benefit that, unlike more conventional processors, the need for many local registers to support multi-operand instructions is avoided.

Moreover, the proposed architecture beneficially allows each processor to be implemented as a short-pipeline processor having three stages, two stages, or even a single stage. Whilst the use of such short pipeline processors is counter-intuitive, in the context of advanced architectures having multiple processors, multiple data memories and multiple program memories, the use of short pipeline processors can simplify the coding of efficient parallel algorithms. Moreover, short processing loops can be completed efficiently without causing pipeline stalls which is a significant advantage in digital signal processing where short processing loops are common. The use of short pipeline processors also make relatively precise prediction of the execution time of a particular code routine easier. This, in turn, makes it easier to coordinate the operation of several parallel algorithms, because their execution time is known more accurately, and hence can simplify the coding process for complex programs involving interaction between multiple algorithms.

Thus, the counter-intuitive approach of using relatively slow processor speeds (that are slower than the clock speed of the associated memory) with an advanced parallel processing architecture having separate shared program memory and shared data memory allows greater processing efficiency than the generally accepted approach of using increasingly faster processors in each subsequent iteration of architecture design. Moreover, by appropriate design, this architecture can still deliver high overall processing speeds with improved execution time predictability, simplified coding, and fewer pipeline stalls.

12 Core 4-Phase Processor Configuration

Figure 5:
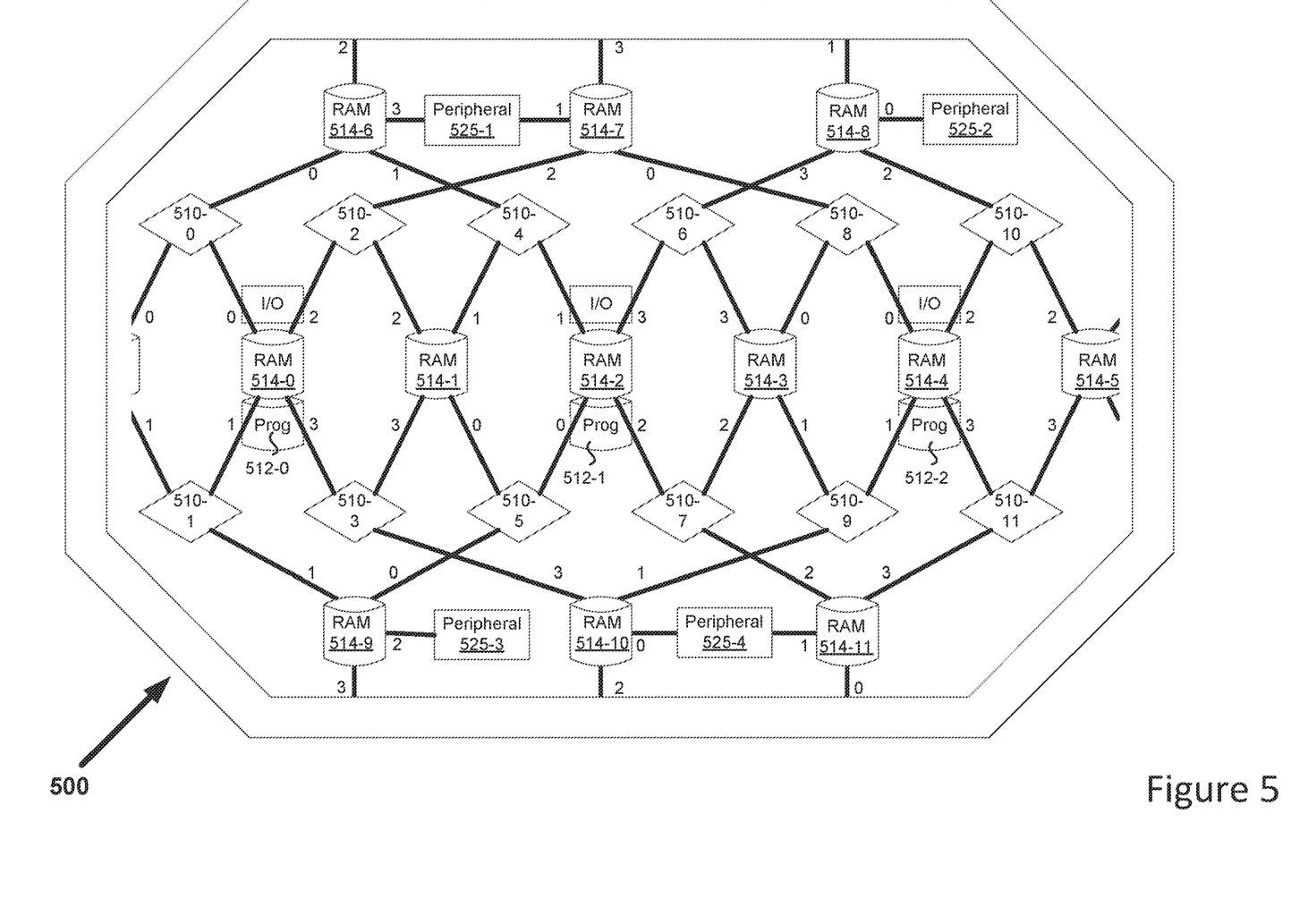

FIG. 5 shows, generally at 500, an exemplary parallel processing architecture that is based on the parallel processing configuration of FIG. 3.

The parallel processing architecture 500 of FIG. 5 is similar to that of FIG. 4 save that it comprises a 12-core 4-phase processor configuration comprising twelve processors 510-0 to 510-11, twelve shared data memories 514-0 to 514-11, and three shared program memories 512-0 to 512-2. The shared memories 512 and 514 may be provided on any suitable number of physical memory devices including a single chip. It will be appreciated that, in FIG. 5, shared data memory 514-5 is shown, in part, on both the left hand side and right hand side of the figure.

Shared data memories 514-0, 514-2 and 514-4 are each associated with a respective program memory 512-0, 512-1, and 512-2. It will be appreciated that shared data memories 514-0, 514-2 and 514-4 may each form part of the same memory as the associated program memory 512-0, 512-1, and 512-2 if dual or multi-ported memory is used.

It will be appreciated that the number of separate shared data/program memories in this, or the other examples described herein, may be reduced by use of dual-ported (or multi-ported) memories rather than single ported memories. For example, shared data memories 514-0, 514-2 and 514-4 and/or shared program memories 512-0, 512-1, and 512-2 may form part of a single multi-ported memory (or fewer dual ported memories) that can be simultaneously accessed by multiple processors. Similarly, shared data memories 514-1, 514-3 and 514-5 may form part of a single multi-ported memory (or fewer dual ported memories).

Like the example of FIG. 4 in the parallel processing architecture 500 of FIG. 5 shared data memories 514-0, 514-2 and 514-4 and shared program memories 512-0, 512-1, and 512-2 are associated with input/output ports for receiving an input from or providing an output to a source external to the architecture 500. Also like the example of FIG. 4 the parallel processing architecture 500 of FIG. 5, in this example, also comprises six shared memories 514-6 to 514-11 in which the processors 510 can store and retrieve data which may be shared with another processor 510, an external memory interface and a peripheral 525. External access to this memory may be via the external memory interfaces (e.g. 514-6 in phase 2, 514-7 in phase 3, 514-8 in phase 1, 514-9 in phase 3, 514-10 in phase 2 and 514-11 phase 0).

As seen in FIG. 5, the shared program memories 512 and shared data memories 514 of this example are each shared by four processors 510 or by four devices (which may be a processor, peripheral or external memory interface). Each processor 510 in this example is therefore typically operated at a clock speed of a quarter that of each memory.

Operation of the 12-core 4-phase processor configuration at the heart of the parallel processing architecture 500 comprises four phases, phases 0 to 3, as represented by the single digit connector labels 0 to 3 in FIG. 5. Operation during each phase is similar to that described with reference to FIG. 4 with access to each shared memory 512, 514, in each phase, being provided to a different respective one of the four processors 510 that shares that memory as illustrated by the single digit connector labels. Accordingly, for reasons of conciseness, operation will not be re-described in detail.

12 Core 3-Phase Processor Configuration

Figure 6:
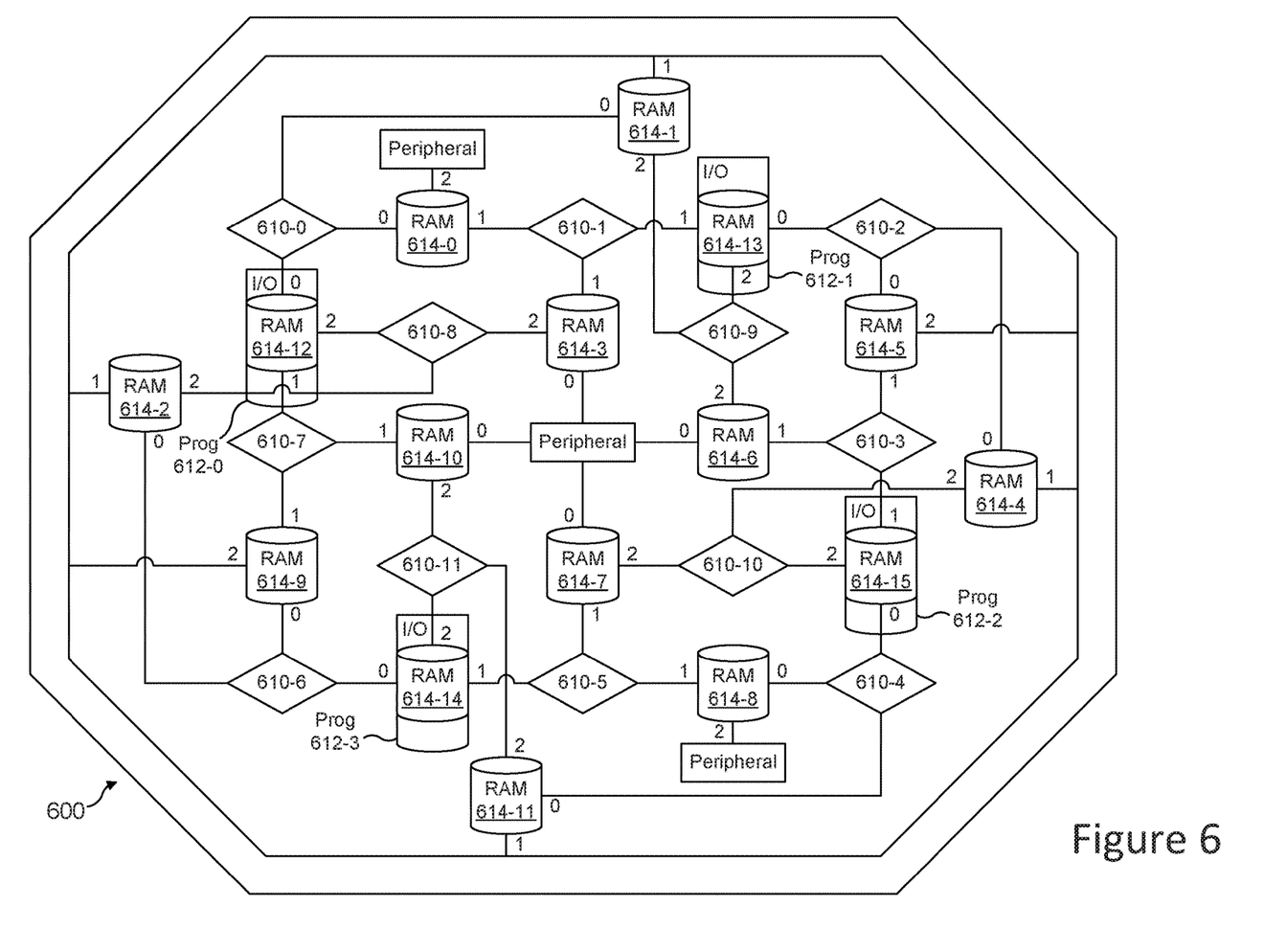

FIG. 6 shows, generally at 600, an exemplary parallel processing architecture that is based on the parallel processing configuration of FIG. 3.

The parallel processing architecture 600 of FIG. 6 is similar to that of FIGS. 4 and 5 save that it comprises a 12-core 3-phase processor configuration comprising twelve processors 610-0 to 610-11, sixteen shared data memories 614-0 to 614-15, and four shared program memories 612-0 to 612-3.

In the parallel processing architecture 600 of FIG. 6 shared program memories 612 are each associated with input/output ports for receiving an input from or providing an output to a source external to the architecture 600.

As seen in FIG. 6, the shared program memories 612 of this example are each shared by three processors 610. The shared data memories 614 of this example are each shared by three processors 610, or by two processors 610 and an external memory interface, or by two processors 610 and a peripheral.

Each processor 610 in this example is therefore typically operated at a clock speed of a third that of the memories.

Operation of the 12-core 3-phase processor configuration at the heart of the parallel processing architecture 600 comprises three phases, phases 0 to 2, as represented by the single digit connector labels 0 to 2 in FIG. 6. Operation during each phase is similar to that described with reference to FIG. 4 with access to each shared memory 612, 614, in each phase, being provided to a different respective one of the either three processors 610, or two processors 610 and an external memory interface, or two processors 610 and a peripheral, that shares that memory as illustrated by the single digit connector labels in FIG. 6. Accordingly, for reasons of conciseness, operation will not be re-described in detail.

12 Core 2-Phase Processor Configuration

Figure 7:
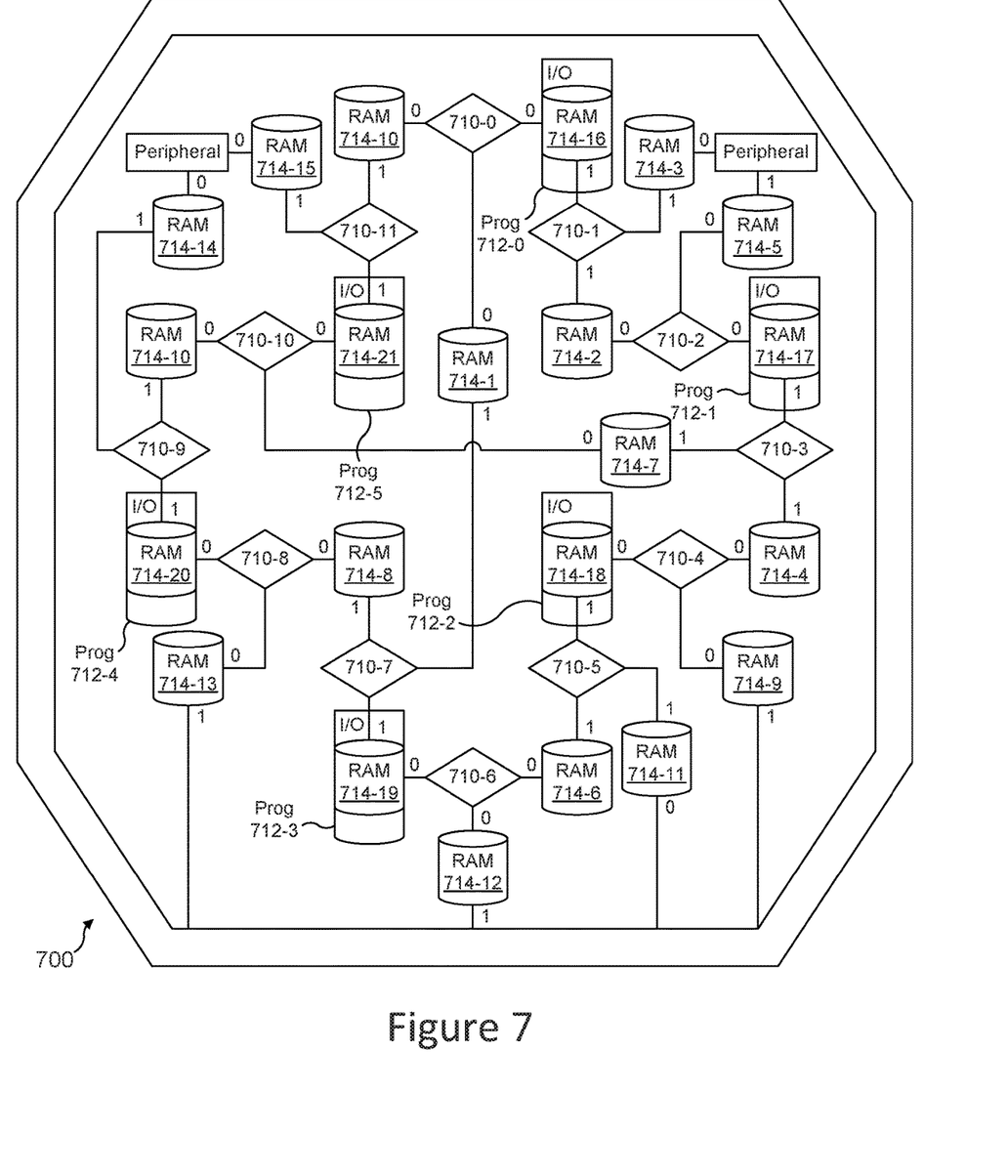

FIG. 7 shows, generally at 700, an exemplary parallel processing architecture that is based on the parallel processing configuration of FIG. 3.

The parallel processing architecture 700 of FIG. 7 is similar to that of FIGS. 4, 5 and 6 save that it comprises a 12-core 2-phase processor configuration comprising twelve processors 710-0 to 710-11, twenty two shared data memories 714-0 to 714-21, and six shared program memories 712-0 to 712-5.

In the parallel processing architecture 700 of FIG. 7 the shared program memories 712 are each associated with input/output ports for receiving an input from or providing an output to a source external to the architecture 700.

As seen in FIG. 7, the shared program memories 712 of this example are each shared by two processors 710. The shared data memories 714 of this example are arranged such that each processor 710 has access to three data memories 714. Some of the data memories 714 are shared between two processors 710 and some, however, are shared between a single processor 710 and one of the following: an external memory interface and a peripheral.

Each processor 710 in this example is therefore typically operated at a clock speed of a half that of the memories that they share.

Operation of the 12-core 2-phase processor configuration at the heart of the parallel processing architecture 700 comprises two phases, phases 0 to 1, as represented by the single digit connector labels 0 and 1 in FIG. 7. Operation during each phase is similar to that described with reference to FIG. 4 with access to each shared memory 712, 714, in each phase, being provided to a different respective one of the processors/external memory interfaces/peripherals that shares that memory as illustrated by the single digit connector labels in FIG. 7. Accordingly, for reasons of conciseness, operation will not be re-described in detail.

What is claimed is:

1. Processing apparatus comprising a parallel processing configuration having a plurality of processors, a plurality of shared data memories and at least one shared program memory; wherein each shared data memory is shared between a respective plurality of said processors and each shared program memory is shared between a respective plurality of said processors, wherein each of said plurality of processors is operated at a first clock speed and said plurality of shared data memories and said at least one shared program memory are operated at a second clock speed wherein said first clock speed is lower than said second clock speed; wherein each processor is connected to more than one other processor via at least one of said plurality of shared data memories; wherein each processor is configured to be able to read or write to at least two shared data memories of the plurality of shared data memories simultaneously in a single processor clock cycle, wherein the processing apparatus is configured to schedule read or write access to the plurality of shared data memories in a phased manner in which no two processors of the plurality of processors have simultaneous access to the shared data memories at the same time even when each processor has access to read from or write to at least two shared data memories simultaneously in a single processor clock cycle; and wherein each processor is arranged to complete instructions at an average rate of one instruction per processor clock cycle even when the instructions required read or write access to a plurality of items of data and therefore require a plurality of read or write operations.

2. Processing apparatus as claimed in claim 1 wherein the processors, at least one shared data memory and at least one shared program memory form a connected mesh that allows transfer of data between any processors in the mesh.

3. Processing apparatus as claimed in claim 1 wherein the first clock speed is configured, to allow each processor to be implemented using low-power silicon logic circuits selected from a standard digital logic gate library characterised by at least one of the following parameters: low-power process; low supply voltage; and high voltage threshold.

4. Processing apparatus as claimed in claim 1 wherein each data memory is shared between a respective subset of said plurality of processors.

5. Processing apparatus as claimed in claim 1 wherein said at least one shared program memory comprises a plurality of shared program memories wherein each program memory is shared between a respective subset of said plurality of processors.

6. Processing apparatus as claimed in claim 1 wherein said plurality of data memories comprise at least one data memory that is shared between a plurality of processors and at least one other entity.

7. Processing apparatus as claimed in claim 1 wherein said second clock speed is substantially an integer multiple of said first clock speed.

8. Processing apparatus as claimed in claim 1 wherein said first clock speed is configured to be matched to an available access rate of at least one shared data memory of the plurality of shared data memories.

9. Processing apparatus as claimed in claim 1 wherein said first clock speed is configured to be substantially equal to a clock speed of at least one shared data memory of the plurality of shared data memories divided by a quantity of processors and any other entities that share that data memory.

10. Processing apparatus comprising a parallel processing configuration having a plurality of processors, a plurality of shared data memories and at least one shared program memory; wherein each shared data memory is shared between a respective plurality of said processors and each shared program memory is shared between a respective plurality of said processors, wherein each of said plurality of processors is operated at a first clock speed and said plurality of shared data memories and said at least one shared program memory are operated at a second clock speed wherein said first clock speed is lower than said second clock speed; wherein at least one of the processors is a short-pipeline, 1, 2 or 3-stage processor, wherein the processing apparatus is configured to schedule read or write access to the plurality of shared data memories in a phased manner in which no two processors of the plurality of processors have simultaneous access to the same shared data memories at the same time even when each processor has access to read from or write to at least two shared data memories simultaneously in a single processor clock cycle, and wherein each processor is arranged to complete instructions at an average rate of one instruction per processor clock cycle even when the instructions require read or write access to a plurality of items of data and therefore require a plurality of read or write operations.

11. Processing apparatus as claimed in claim 10, wherein each processor is connected to more than one other processor via at least one shared data memory.

12. Processing apparatus as claimed in claim 11, wherein the processors, at least one shared data memory and at least one shared program memory form a connected mesh that allows transfer of data between any processors in the mesh.

13. Processing apparatus as claimed in claim 11, wherein each processor is configured to be able to read or write to a plurality of shared data memories in a single processor clock cycle.

14. Processing apparatus as claimed in claim 10, wherein the first clock speed is configured to allow each processor to be implemented using low-power silicon logic circuits selected from a standard digital logic gate library characterised by at least one of the following parameters: low-power process; low supply voltage; and high voltage threshold.

15. Processing apparatus as claimed in claim 10, wherein each data memory is shared between a respective subset of said plurality of processors.

16. Processing apparatus as claimed in claim 10, wherein said at least one shared program memory comprises a plurality of shared program memories wherein each program memory is shared between a respective subset of said plurality of processors.

17. Processing apparatus as claimed in claim 10 wherein said plurality of shared data memories comprise at least one data memory that is shared between a plurality of processors and at least one other entity.

18. Processing apparatus as claimed in claim 10, wherein said second clock speed is substantially an integer multiple of said first clock speed.

19. Processing apparatus as claimed in claim 10, wherein said first clock speed is configured to be matched to an available access rate of at least one shared data memory of the plurality of shared data memories.

20. Processing apparatus as claimed in claim 10, wherein said first clock speed is configured to be substantially equal to a clock speed of at least one shared data memory of the plurality of shared data memories divided by a quantity of processors and any other entities that share that data memory.

* * * * *